March 11, 1930.  H. G. FISHER  1,749,877
WATER SYSTEM
Filed Nov. 24, 1925   3 Sheets-Sheet 1

Inventor
Harry G. Fisher
By Spencer Sewall & Hardman
his Attorneys

March 11, 1930.  H. G. FISHER  1,749,877
WATER SYSTEM
Filed Nov. 24, 1925   3 Sheets-Sheet 2

Inventor
Harry G. Fisher
By Spencer Sewall & Hardman
his Attorneys

March 11, 1930.  H. G. FISHER  1,749,877
WATER SYSTEM
Filed Nov. 24, 1925   3 Sheets-Sheet 3

Inventor
Harry G. Fisher
By Spencer Small & Hardman
his Attorneys.

Patented Mar. 11, 1930

1,749,877

UNITED STATES PATENT OFFICE

HARRY G. FISHER, OF DAYTON, OHIO, ASSIGNOR TO DELCO-LIGHT COMPANY, OF DAYTON, OHIO, A CORPORATION OF DELAWARE

WATER SYSTEM

Application filed November 24, 1925. Serial No. 71,211.

This invention relates to water systems employing a pump operated preferably by an electric motor; a storage tank into which water is delivered by the pump and stored under the pressure of air in the tank; and a controller for closing the motor switch when the pressure in the tank falls below a certain value, and for opening the motor switch when the pressure exceeds a certain value.

One of the objects of the invention is to provide for charging the storage tank with air intermittently, so as to make up for the air which has been absorbed by the water in the tank. In order to accomplish this object, the present invention provides a small auxiliary tank which may receive air while the pump is not operating, and then be connected between the pump and the storage tank so that the water delivered by the pump will force the air in the auxiliary tank into the storage tank.

The mechanism for controlling the venting of the auxiliary tank to atmosphere and the draining thereof, and then the connecting of the tank in series with the pump and storage tank is controlled automatically by the pressure controlled switch for starting and stopping the motor which drives the pump. In this way, the auxiliary tank is permitted to drain and to receive air while the pump is not operating; and, when the pump begins to operate in response to a certain low air pressure in the storage tank, the auxiliary tank will be connected with the pump and storage tank so that the air in the auxiliary tank will be forced into the storage tank.

Further objects and advantages of the present invention will be apparent from the following description, reference being had to the accompanying drawings wherein a preferred form of the present invention is clearly shown.

Figure 1:
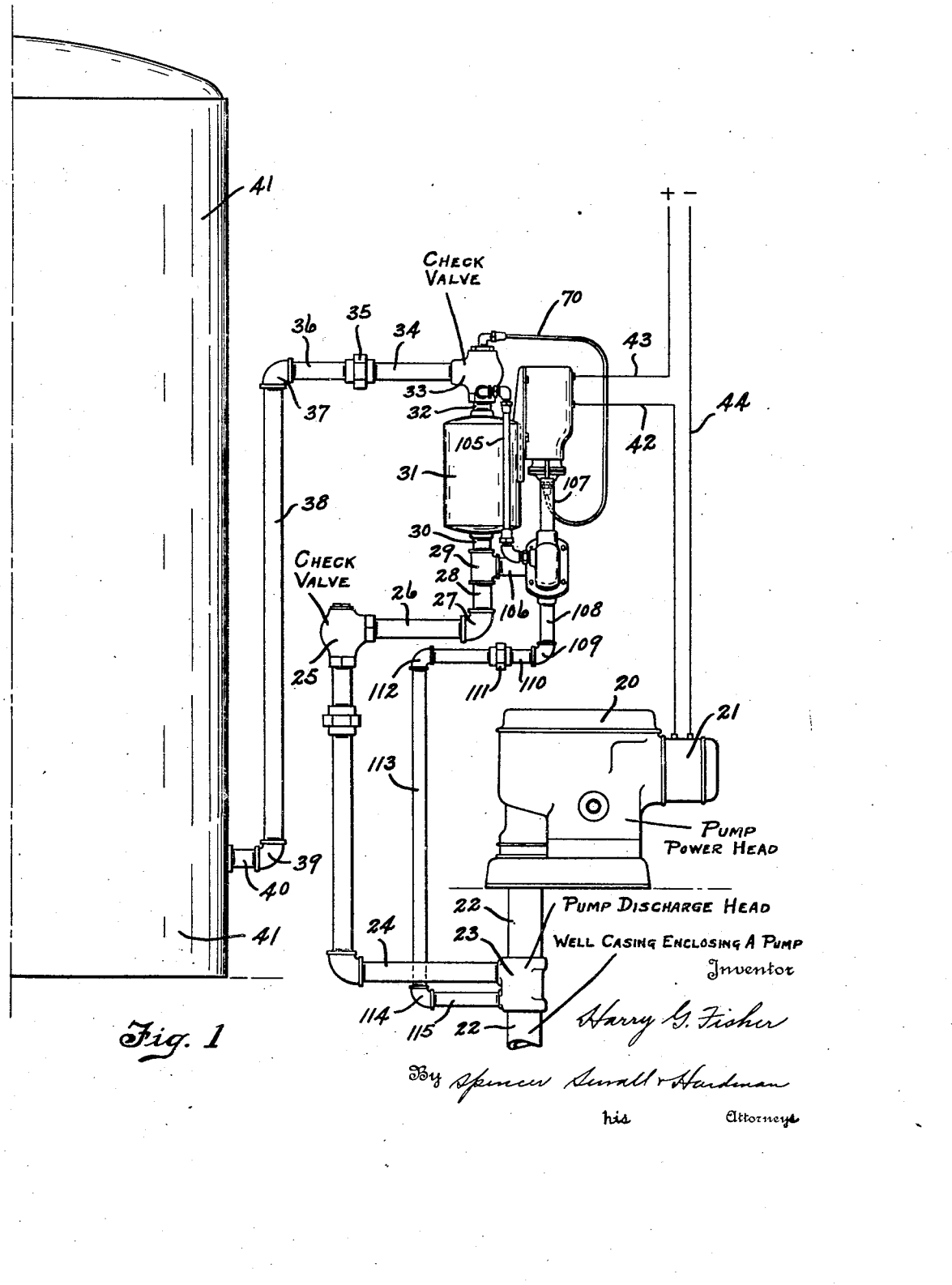
Fig. 1 is a diagrammatic view of a water system employing the present invention.

Referring to the drawings, 20 designates a power head or mechanism operated by an electric motor 21 for the purpose of converting the rotary motion of the motor into reciprocating motion for operating a pump plunger (not shown), but which is located, as known to those skilled in the art, within a well casing 22. The well casing includes a pump discharge head 23 to which is attached a pump outlet pipe 24 which is connected, as shown in Fig. 1, with a check valve 25. The outlet of the valve 25 is connected by pipe 26, L 27, pipe 28, T 29 and pipe 30 with a relatively small auxiliary tank 31, called the "air charger tank". The outlet of tank 31 is connected by pipe 32 with a check valve 33, the outlet of which is connected by pipe 34, union 35, pipe 36, L 37, pipe 38, L 39 and pipe 40 with a pressure storage tank 41.

Figure 2:
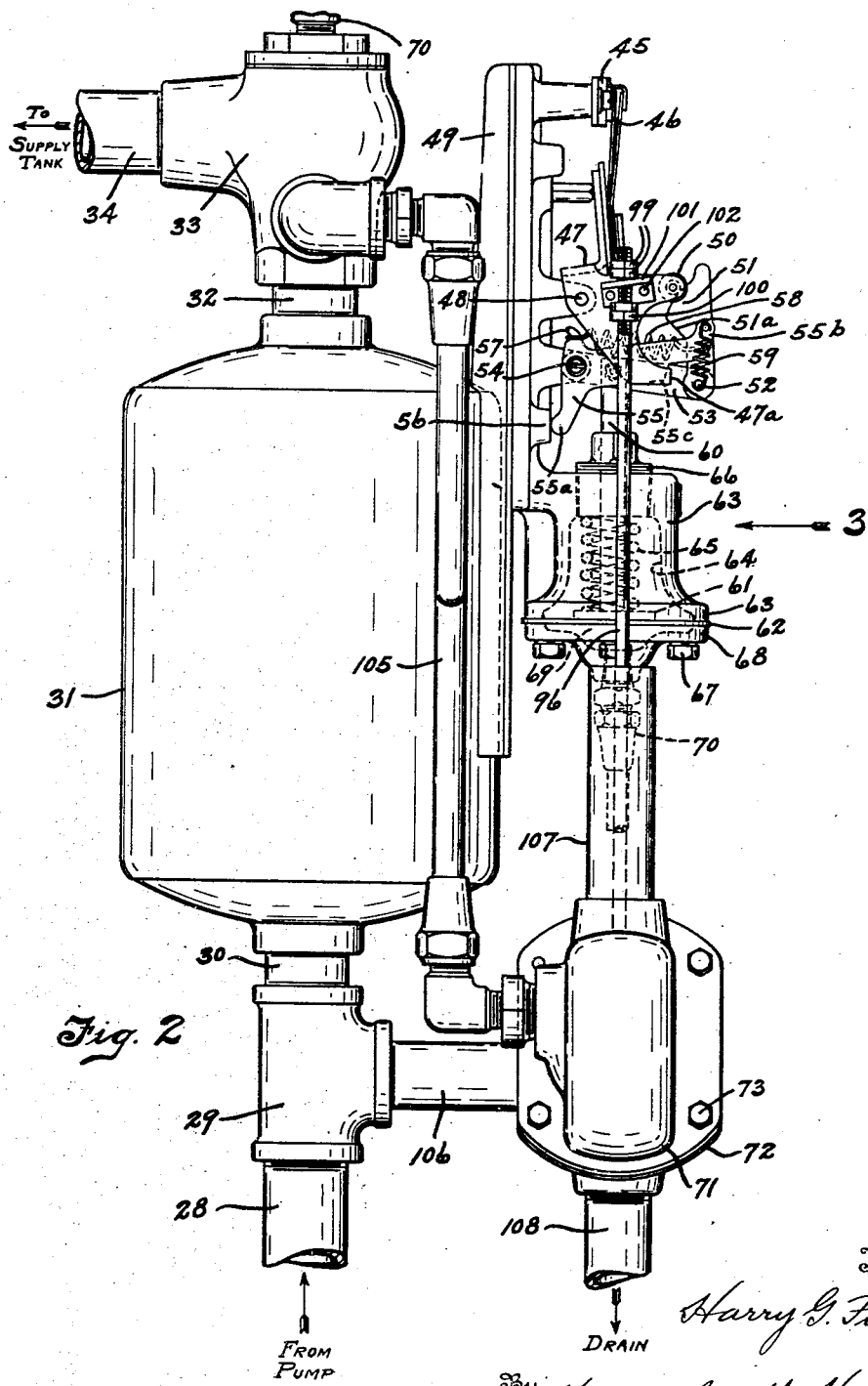
Fig. 2 is a side view on a larger scale than Fig. 1 of the air charger and mechanism for controlling the air charger and the motor which operates the pump.
Figure 3:
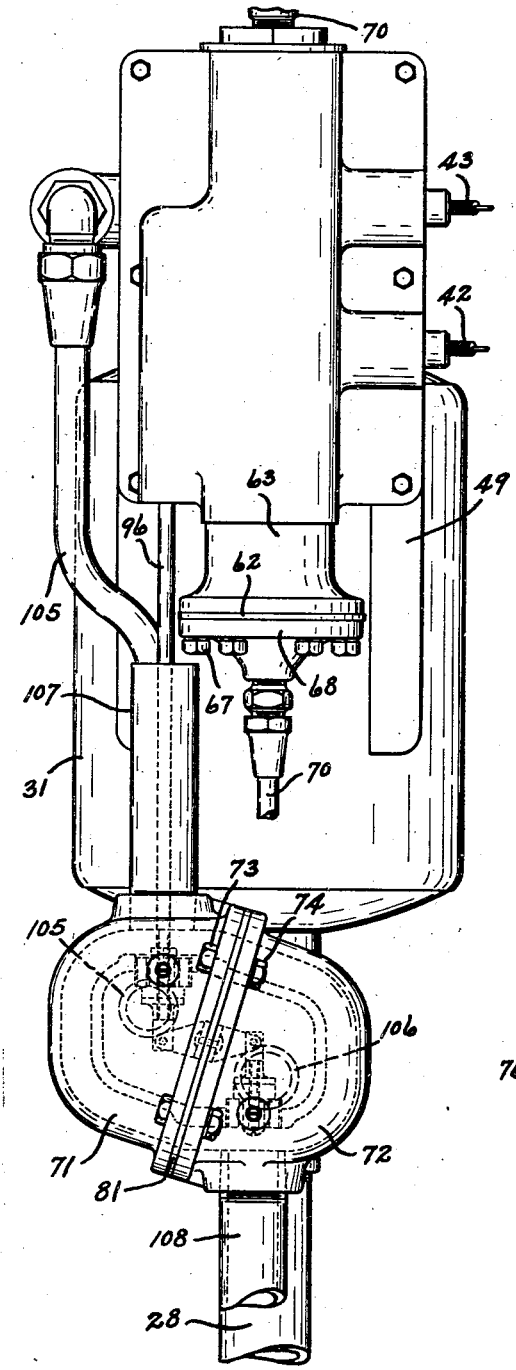
Fig. 3 is a view of the apparatus looking in the direction of the arrow 3 in Fig. 2.

The motor circuit, represented by wires 42, 43 and 44 in Fig. 1, is controlled by a switch which includes a stationary contact 45 and a movable contact 46. (See Fig. 2.) Contact 46 is mounted on a lever 47 which is pivoted at 48 upon a bracket 49 which is supported by the tank 31. The lever 47 supports a roller 50 which is engaged by cam 51 which is pivoted at 52 upon a lever 53 which is pivoted at 54 upon the bracket 49. A lever 55 is also pivoted at 54 and is provided with a stop arm 55ª for engaging a stop 56 provided by the bracket 49. The lever 55 is provided with a hook 57 for engaging one end of a spring 58, the other end of which is attached to the cam 51, thereby holding the cam 51 yieldingly in engagement with the roller 50. The lever 55 has an arm 55ᵇ which is connected by a spring 59 with the pin 52 providing the pivot of the lever cam 51 upon the lever 53. The lever 55 is provided with a shoulder 55ᶜ which, as shown in Fig. 2, is engaged by an ear 47ª provided by the lever 47. A rod 60 connects the lever 53 with a disc 61 resting against a flexible diaphragm 62 which is located between a member 63 having therein a recess 64 for receiving a spring 65 bearing at one end against the bushing 66 which guides the rod 60, and bearing at its other end against the disc 61. The screws 67 clamp the diaphragm 62 and the diaphragm cover 68 to the member 63. The cover 68 provides a recess 69 for receiving water under pressure which is transmitted from the pressure storage tank 41 through the connections 33 to 40, already described, and also through a pipe 70 which connects the check valve 33 with the cover 68.

When the pressure in the storage tank diminishes below a certain value, the spring 65 will be permitted to move the rod 60 into the position shown in the drawings, thereby causing the lever 53 to pull the cam 51 into the position shown. In this position of the cam, the roller 51 is pressed in the direction such as to cause the switch contact 46 to engage the contact 45. The motor circuit being closed, the pump is operated to force water through the pipe connections 23 to 40, described, into the pressure storage tank 41. When the pressure in the tank 41 exceeds a certain amount, the diaphragm 62 will be moved upwardly, as viewed in Fig. 1, a distance which is sufficient to cause the oblique camming surface 51$^a$ of the cam to engage the roller 50, thereby causing the contact 46 to be moved clockwise and away from the contact 45. The engagement of the parts 55$^c$ and 47$^a$ causes the contacts to remain closed until after the camming surface 51 has been brought into engagement with the roller 50.

In order that each time the pump ceases to operate, the tank 31 will be vented and drained, and in order that when the pump operates again the tank 31 will be disconnected from atmosphere and the drain and will be connected only between the pump and the pressure tank 41, there is provided a mechanism which is responsive to the operations of the motor controlling switch. This mechanism includes parts which are located within two valve housing members 71 and 72 which, when bolted together by bolts 73 and nuts 74, provide central chambers 75$^a$ and 75$^b$ which are surrounded by a conduit 76. The chambers 75$^a$ and 75$^b$ are connected with conduit 76 through bushings 77 and 78, respectively, which provide seats for valves 79 and 80, respectively. The gasket which forms a seal between the members 71 and 72, is provided by a flexible sealing member or diaphragm 81, having holes 82 therein providing for the continuity of the passage 76. The diaphragm 81 separates the chambers 75$^a$ and 75$^b$ and supports lever parts 83 and 83$^a$ secured by rivets 83$^b$ to the member 81. The lever 83 is connected by pin 84 with a nut 85 which receives a screw 86 passing through a sleeve 87 and through the valve 80. The sleeve 87 is received loosely within the bushing 78 and provides a guide limiting the swinging of the valve 80 during its up and down movements. The lever 83$^a$ is connected by a pin 94 with a nut 95 which receives a rod 96 passing through a sleeve 97, the valve 79 and having threaded engagement with a nut 98. By turning down the nut 98, the sleeve 97 and valve 79 are clamped against the nut 95. The sleeve 97 is loosely received within the bushing 79 which guides vertical movements.

Figure 4:
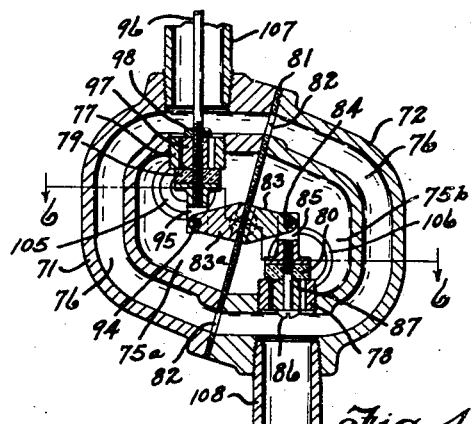
Figs. 4 and 5 are sectional views showing the valves which control the air charger in two positions of adjustment.
Figure 5:
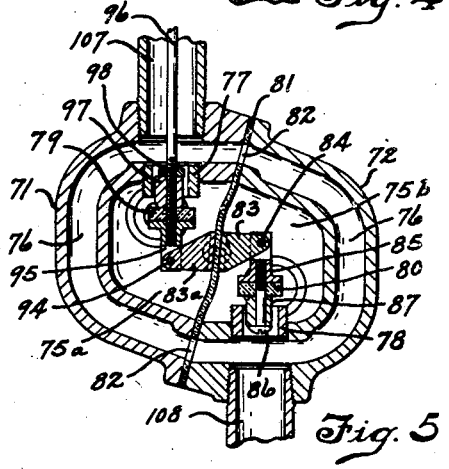

The upper end of rod 96 is threaded to receive nuts 99 and 100, between which is located the apertured leg of an angle bracket 101, said leg receiving the rod 96. The other leg of the bracket is attached by rivets 102 to the lever 47. When the switch is in position for closing the motor circuit, as shown in Fig. 2, the rod 96 will be maintained in a position to hold the valves 79 and 80 closed, as shown in Fig. 4. When the switch is open to stop the motor, the valves 79 and 80 will be moved to the position shown in Fig. 5, for a purpose to be described.

Figure 6:
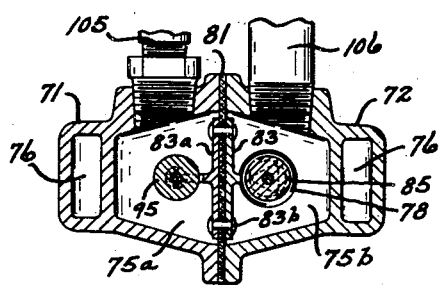
Fig. 6 is a view on the line 6—6 of Fig. 4.

As shown in Fig. 6, the chamber 75$^a$ is connected by a pipe 105 with the check valve 33 at a point between the check valve seat and the entrance to the check valve. The chamber 75$^b$ is connected by pipe 106 with the T 29. The conduit 76 is connected with a vertical pipe 107 which surrounds rod 96, and with a pipe 108 connecting the conduit 76 with drain pipe connections 109, 110, 111, 112, 113, 114 and 115. The pipe 115 is connected with the well casing 22 in such a manner that water will drain from the pipe 115 back into the well.

Since during the operation of the pump, the valves 79 and 80 are located, as shown in Fig. 4, no water will flow from the pipe 106 and chamber 75$^b$ into the drain 108, and no water will flow from the check valve 33, pipe 105 and chamber 75$^a$ into the drain conduit 76 in the drain pipe 108. When the pump stops, and the valves 79 and 80 are moved into the position shown in Fig. 5, the tank 31 will be vented and connected with the drain pipe 108. The venting of the tank to atmosphere is provided by pipe 107, conduit 76, bushing 77, chamber 75$^a$, pipe 105, check valve 33 and pipe 32. The drain for the tank 31 is provided by pipe 30, T 29, pipe 106, chamber 75$^b$, bushing 78, conduit 76 and drain pipe connections 108 to 115, leading to the well casing 22.

At the time of opening the motor switch and opening the valves 79 and 80, water may continue to flow for a short time through the tank 31 due to inertia of the water or of the pump and operating mechanism. Water which may flow into the chamber 75$^a$ before the water in the pump discharge pipes comes to rest will be drained and will overflow the bushing 77 and flow through passage 76 into the drain. Hence it is desirable that chamber 75$^a$ be connected with the drain 108 as well as with the vent pipe 107. To assist draining the chamber 75ᵇ, it is connected with the vent pipe 107 through passage 76.

It is, therefore, apparent, that a small quantity of air will be delivered to the storage tank each time the pump is brought into operation. While the amount of air charged into the tank is independent of the quantity of air actually absorbed by the water in the tank within a given time, it is apparent that the capacity of the auxiliary tank may be such as to supply the storage tank with a quantity of air sufficient to compensate for the average amount of air absorbed during the idle period of the pump.

While the form of embodiment of the present invention constitutes a preferred form, it is to be understood that other forms might be adopted all coming within the scope of the claims which follow.

What is claimed is as follows:

1. A water system comprising, in combination, a pump, a pressure storage tank, a motor for operating the pump, an auxiliary air receiving tank connected between the pump and storage tank, means for causing the motor to operate and stop in response to certain low and high pressures, respectively, in the storage tank, and valve mechanism directly controlled by said means for causing the auxiliary tank to be drained and to receive air while the pump is idle, and for causing the auxiliary tank to be connected only with the pump and storage tank when the pump is operating.

2. A water system comprising, in combination, a pump, a pressure storage tank, an electric motor for operating the pump, an auxiliary air receiving tank connected between the pump and storage tank, a motor switch, means for closing and opening said switch in response, respectively, to certain low and high pressures in said storage tank, and valve mechanism directly controlled by said means for causing the auxiliary tank to be drained and to receive air while the pump is idle, and for causing the auxiliary tank to be connected only with the pump and storage tank when the pump is operating.

3. A water system comprising, in combination, a pump, a pressure storage tank, an auxiliary air receiving tank connected between the pump and storage tank, and valve mechanism for allowing the air tank to be vented and drained, said mechanism including two chambers connected respectively with upper and lower portions of the air tank and each having an outlet port, a drain passage and a vent passage connected one with each port respectively, valves controlling said ports and means for operating said valves.

4. A water system comprising, in combination, a pump, a pressure storage tank, an auxiliary air receiving tank connected between the pump and storage tank, and valve mechanism for allowing the air tank to be vented and drained, said mechanism including two adjacent chambers connected respectively with upper and lower portions of the air tank and having outlet ports, a passage surrounding the chambers and connected with said outlet ports, a vent connected with the upper portions of said passage, a drain connected with the lower end of said passage, valves controlling said ports, and means for actuating said valves.

5. A water system comprising, in combination, a pump, a pressure storage tank, an auxiliary air receiving tank connected between the pump and storage tank, and valve mechanism for allowing the air tank to be vented and drained, said mechanism including two adjacent chambers connected respectively with upper and lower portions of the air tank and having outlet ports, a passage surrounding the chambers and connected with said outlet ports, a vent connected with the upper portion of said passage, a drain connected with the lower end of said passage, a flexible wall separating said chambers, valves controlling said ports, means carried by the flexible wall for supporting the valves, and means for actuating said valves.

6. A water system comprising, in combination, a pump, a pressure storage tank, an auxiliary air receiving tank connected between the pump and storage tank, and valve mechanism for allowing the air tank to be vented and drained, said mechanism including two chambered bodies and a flexible gasket secured between them, said bodies and gasket, when assembled, providing two central chambers surrounded by a passage connected through ports with said chambers, and said gasket providing a flexible wall between the central chambers, pipes connecting the central chambers respectively with upper and lower ports of the air tank, valves for closing said ports and supported by the flexible wall, a vent connected with the upper portion of said passage, a drain connected with the lower portion of said passage, and means for actuating said valves.

7. A water system comprising, in combination, a pressure storage tank, means for supplying water to the tank, a motor for actuating said supply means, means for controlling the motor, an auxiliary air receiving tank connected between the supply means and the storage tank and means actuated by said control means for automatically draining and venting the auxiliary tank when no water flows from the supply means to the storage tank and for automatically causing the auxiliary tank to be connected only to the pump and storage tank when water flows to the storage tank.

8. A water system comprising, in combination, a pressure storage tank, a pump for supplying water to the tank, a motor for actuating the pump, means for controlling the motor, an auxiliary air receiving tank connected between the pump and storage tank, a vent passage and a drain passage connected with said auxilary tank and means actuated by said control means for automatically opening said passages when the pump is idle and for automatically closing said passages when the pump is working.

In testimony whereof I hereto affix my signature.

HARRY G. FISHER.